Patented Apr. 23, 1935

1,998,540

UNITED STATES PATENT OFFICE 1,998,540

IRON OXIDE PIGMENT AND PROCESS OF PRODUCING THE SAME AS BY-PRODUCTS OF THE REDUCTION OF AROMATIC NITRO COMPOUNDS

Ulrich Haberland, Uerdingen, Germany, assignor to I. G. Farbenindustrie Aktiengesellschaft, Frankfort-on-the-Main, Germany No Drawing. Application December 19, 1931, Serial No. 582,171. In Germany December 24, 1930

11 Claims. (Cl. 134—59)

The present invention relates to a process of producing iron oxide pigments; more specifically it relates to a process in which a finely divided iron oxide sludge suitable as a color pigment after drying or calcining is obtained as a by-product from the reduction of aromatic nitro compounds to the corresponding amines by means of iron and acid or an acid reacting salt.

In the methods of producing aromatic amines from aromatic nitro compounds heretofore known and used from a long time involving the use of iron and an amount of acid insufficient to dissolve the same or a salt exerting an acid reaction due to hydrolysis, the iron serving as the reducing agent generally changes into a brownish black oxide whose composition corresponds to a formula lying between $Fe_3O_4$ and $Fe_2O_3$. This oxide is not useful as a color pigment and is of very inferior quality on account of its slight coloring and covering power.

To illustrate the old process it may be stated that in the manufacture of aniline with every 100 parts of nitrobenzene about 100 parts of iron, 8 to 10 parts of concentrated hydrochloric acid (specific gravity 1.16) and about 100 parts of water are employed. The reduction is carried out by adding the nitrobenzene and iron to the hydrochloric acid and water heated to about 100° at such a rate that the temperature of about 100° C. is maintained by the heat of reaction. When reduction is finished, the oily layer of aniline is drawn off and the remaining aqueous liquid distilled by steam after having added some lime, if necessary. The iron oxide represents a waste product of no commercial value. As is further known, the hydrochloric acid employed in the reduction may be substituted by a more or less equivalent quantity of sulfuric acid, acetic acid, sulfurous acid or the like or by a dilute solution i. e. an aqueous solution containing less than 5 percent of a salt exerting an acid reaction due to hydrolysis such as ferrous chloride without changing the properties of the resulting iron oxide sludge.

In accordance with the processes described in U. S. application Serial No. 385,457, filed August 12, 1929, now Patent No. 1,849,428, and U. S. Patents 1,793,941 and 1,793,942 the reduction is carried out under such conditions that the aqueous phase of the reaction mixture is an acid-reacting highly concentrated salt solution, i. e. an aqueous solution which contains at least 12 percent of a dissolved salt, preferably 15 to 25% and the concentration of which may rise as far as the saturating concentration of the respective salt and does not fall below the limit of 12 percent during the reduction process. Under the conditions specified in the aforesaid patents there remains after separating the aromatic amine obtained by the reduction process an iron oxide sludge which is substantially free from acidic residues and is adapted to form commercial iron oxide pigments, either directly or after calcination.

The present invention is an improvement of the processes claimed in U. S. application Serial No. 385,457, filed August 12, 1929, now Patent No. 1,849,428, and U. S. Patents 1,793,941 and 1,793,942. I have found that an addition of lead compounds such as lead oxide or lead salts to the reduction agents of the aforesaid specifications will considerably improve the commercial grade of the iron oxide pigments obtainable as by-products of the reduction process. In other words, my process comprises as the principal feature reducing an aromatic nitro compound with metallic iron, lead compounds and an acid reacting concentrated aqueous solution of a salt, it being understood that the acidity of the mixture should not suffice to dissolve the iron and the amount and concentration of the salt present should be sufficient to form an iron oxide sludge adapted to form a commercial iron oxide pigment. When carrying out the reduction in the presence of lead compounds, a slurry is obtained from which after levigation, washing and drying at temperatures from about 100° C. to about 200° C. ferrous ferric oxides result having a deep and bluish black or brownish shade which may be converted to bluish red or bright red iron oxide pigments by calcining them at a temperature range from about 650° to about 800° C. and preferably at a temperature of about 700° C. The lead compounds may be added in the form of oxides or salts.

The amount of lead oxide or lead salts such as plumbous oxide, plumbo-plumbic oxide, lead chloride, lead nitrate, lead carbonate, lead acetate, lead propionate, lead benzoate etc. used in the reduction may vary within wide ranges. Calculated on the quantity of metallic iron used it may vary from about 2 percent to about 15 percent. Before calcining, the pigments obtained according to this invention comprise substantially ferric oxide with a small amount of ferrous oxide. Furthermore these pigments contain a lead oxide in an amount depending on the amounts of lead compounds employed in the reduction process.

My new brown iron oxide pigments are homogeneous and may thus be distinguished from the previously known brown iron oxide pigments. A microscopic examination of my new pigments will show that each of their constituent particles is of a uniform brown shade, whereas it can be readily ascertained under a microscope that the previously known brown iron oxide pigments consist of a mixture of red, black and, in some cases, also yellow particles. It is possible to isolate these differently colored constituents of the known products by purely physical means, such, as, for example, levigation. In view of the homogeneous character of my new pigments, such an isolation of vari-colored constituents is not possible in their case.

My invention is illustrated by the following examples without being restricted thereto. The parts are by weight. Other aromatic nitro compounds such as nitro toluene, α-nitronaphthalene and furthermore chloro-, hydroxy- and amino-nitro compounds, poly-nitro compounds and nitrosulfonic acids may be used and, in particular, I wish to be understood that all the salts covered by the above mentioned U. S. application Serial No. 385,457, filed August 12, 1929, now Patent No. 1,849,428, and U. S. Patents 1,793,941 and 1,793,942 will be operative in the process claimed in this specification.

*Example 1*

127 parts of a ferrous chloride solution of specific gravity 1.27 are heated to boiling with 2.5 parts of lead carbonate, 150 parts of water and 200 parts of ground iron powder are added and 200 parts of nitrobenzene are run in at the boiling temperature. When the reduction is complete and the aniline produced has been separated there are obtained by washing and drying the ferrous-ferric oxide sludge formed, 240 parts of a mineral pigment of beautiful bluish black shade and satisfactory covering power.

This pigment comprises 87.3 percent of ferric oxide, 3.1 percent of ferrous oxide and 1.9 percent of lead calculated as plumbous oxide.

When instead of the above specified quantity of 2.5 parts of lead carbonate 5 parts are used a valuable brown iron oxide pigment is produced.

Calcination yields from the black product a beautiful bluish red and from the brown product a light, bright red pigment.

*Example 2*

To a mixture of 127 parts of a ferrous chloride solution of specific gravity 1.27 and 6 parts of lead chloride are added 200 parts of ground iron powder. Then 200 parts of nitro benzene are run in at boiling temperature. After completion of the reduction the aniline produced is separated. The sludge obtained is levigated, washed and dried. There result 242 parts of a mineral pigment of a fine brown shade which possesses an excellent covering power.

By calcining this pigment at a temperature of 700° C. a bright red iron oxide pigment is obtained.

*Example 3*

127 parts of a ferrous chloride solution of specific gravity 1.27 are heated to boiling with 7 parts of lead acetate, 150 parts of water and 200 parts of ground iron powder are added and 200 parts of nitro benzene are run in at the boiling temperature. When the reduction is complete and the aniline produced has been separated there are obtained by washing and drying the ferrous ferric oxide sludge formed 241 parts of a mineral pigment of beautiful brown shade and satisfactory covering power.

Calcination yields from the brown product a beautiful bright red pigment.

I claim:

1. The process which comprises reducing an aromatic nitro compound in the presence of a lead compound with metallic iron and an acid-reacting concentrated aqueous solution of a salt insufficient in amount to dissolve the iron, separating the resulting iron oxide sludge from the resulting aromatic amino compound and purifying the iron oxide sludge by levigation and washing.

2. The process which comprises reducing an aromatic nitro compound in the presence of a lead compound with metallic iron and an acid-reacting concentrated aqueous solution of a salt insufficient in amount to dissolve the iron, separating the resulting iron oxide sludge from the resulting amino compound and purifying the iron oxide sludge by levigation, washing out, drying and calcining.

3. The process which comprises reducing an aromatic nitro compound in the presence of a lead salt with metallic iron and an acid-reacting concentrated aqueous solution of a salt insufficient in amount to dissolve the iron, separating the resulting iron oxide sludge from the resulting amino compound and purifying the iron oxide sludge by levigation and washing out.

4. The process which comprises reducing an aromatic nitro compound in the presence of lead carbonate with metallic iron and an acid-reacting concentrated aqueous solution of a salt insufficient in amount to dissolve the iron, separating the resulting iron oxide sludge from the resulting amino compound and purifying the iron oxide sludge by levigation and washing out.

5. The process which comprises reducing an aromatic nitro compound in the presence of a lead oxide with metallic iron and an acid-reacting concentrated aqueous solution of a salt insufficient in amount to dissolve the iron, separating the resulting iron oxide sludge from the resulting amino compound and purifying the iron oxide sludge by levigation and washing out.

6. The process which comprises reducing an aromatic nitro compound in the persence of a lead compound with metallic iron, an acid-reacting concentrated aqueous solution containing at least 12 per cent of a dissolved salt in an amount insufficient to dissolve the iron, separating the resulting iron oxide sludge from the resulting amino compound and purifying the iron oxide sludge by levigation and washing out.

7. The process which comprises reducing an aromatic nitro compound in the presence of a lead salt with metallic iron, an acid-reacting concentrated aqueous solution containing at least 12 percent of a dissolved salt in an amount insufficient to dissolve the iron, separating the resulting iron oxide sludge from the resulting amino compound and purifying the iron oxide sludge by levigation and washing out.

8. The process which comprises reducing an aromatic nitro compound in the presence of a lead oxide with metallic iron, an acid-reacting concentrated aqueous solution containing at least 12 per cent of a dissolved salt in an amount insufficient to dissolve the iron, separating the resulting iron oxide sludge from the resulting amino compound and purifying the iron oxide sludge by levigation and washing out.

9. The process which comprises reducing nitro benzene in the presence of lead carbonate with metallic iron, an acid-reacting concentrated aqueous solution containing at least 12 percent of ferrous chloride in an amount insufficient to dissolve the iron, separating the resulting iron oxide sludge from the resulting amino compound and purifying the iron oxide sludge by levigation and washing out.

10. The process which comprises reducing nitro benzene in the presence of lead chloride with metallic iron, an acid-reacting concentrated aqueous solution containing at least 12 percent of ferrous chloride in an amount insufficient to dissolve the iron, separating the resulting iron oxide sludge from the resulting amino compound and purifying the iron oxide sludge by levigation and washing out.

11. Metallic oxide pigments comprising a major proportion of ferric oxide and a minor proportion of ferrous oxide and an oxygen compound of lead, said pigments being homogeneous and having brown shades which may be converted by calcination into bright red shades.

ULRICH HABERLAND.